United States Patent
Mhetar

(10) Patent No.: US 6,663,966 B2
(45) Date of Patent: *Dec. 16, 2003

(54) USE OF DENDRIMERS AS A PROCESSING AID AND SURFACE MODIFIERS FOR THERMOPLASTIC RESINS

(75) Inventor: Vijay R. Mhetar, Pittsfield, MA (US)

(73) Assignee: General Electric Company, Schenectady, NY (US)

( * ) Notice: Subject to any disclaimer, the term of this patent is extended or adjusted under 35 U.S.C. 154(b) by 58 days.

This patent is subject to a terminal disclaimer.

(21) Appl. No.: 10/196,642

(22) Filed: Jul. 15, 2002

(65) Prior Publication Data

US 2003/0082384 A1 May 1, 2003

Related U.S. Application Data

(63) Continuation of application No. 09/539,272, filed on Mar. 30, 2000, now Pat. No. 6,497,959.

(51) Int. Cl.[7] .............................. B32B 27/36
(52) U.S. Cl. .................. 428/412; 528/422; 528/423; 528/367; 528/368; 528/369; 264/40.6; 264/310; 264/328.12; 264/328.8; 264/328.16; 264/328.14; 264/328.15; 264/328.1; 264/331.11
(58) Field of Search ................ 428/412; 528/422, 528/423, 367, 368, 369; 264/40.6, 310, 328.12, 328.8, 328.16, 328.14, 328.15, 328.1, 331.11

(56) References Cited

U.S. PATENT DOCUMENTS

| 5,622,804 A | * | 4/1997 | Matsuoka et al. | .......... 430/115 |
| 5,723,250 A | * | 3/1998 | Matsuoka et al. | .......... 430/117 |
| 5,723,511 A | * | 3/1998 | Kazmaier et al. | ............. 522/35 |
| 5,777,129 A |   | 7/1998 | Juneau et al. | ................ 548/455 |
| 5,820,808 A | * | 10/1998 | van Oene et al. | ....... 264/328.12 |
| 5,919,861 A | * | 7/1999 | Kazmaier et al. | .............. 525/26 |
| 6,037,444 A |   | 3/2000 | Rannard et al. | ............ 523/423 |
| 6,051,681 A | * | 4/2000 | Dozeman et al. | ........... 528/485 |
| 6,114,499 A | * | 9/2000 | Kazmaier et al. | ........... 528/480 |
| 6,497,959 B1 | * | 12/2002 | Vijay | ........................ 428/412 |

FOREIGN PATENT DOCUMENTS

| EP | 0 545 184 A2 | 6/1993 |
| EP | 1 013 702 A2 | 6/2000 |
| JP | 11317306 | 11/1999 |
| WO | WO 95/06080 | 3/1995 |
| WO | WO 97/19987 | 6/1997 |
| WO | WO 97/45474 | 12/1997 |
| WO | WO 98/12376 | 3/1998 |

OTHER PUBLICATIONS

Bhave, Aparna et al., "Kinetic Theory and Rheology of Dilute, Nonhomogeneous Polymer Solutions", *J. Chem. Phys.*, vol. 95, No. 4, Aug. 15, 1991, pp. 2988–3000.

Agarwal, U.S. et al., "Migration of Macromolecules Under Flow: the Physical Origin and Engineering Implications", *Chemical Engineering Science*, vol. 49, No. 11, pp. 1693–1717, 1994, Great Britain.

Carr, et al., "Dielectric and mechanical characterizationo of aryl ester dendrimer/PET blends", *Polymer*, vol. 37, No. 12, 1996.

* cited by examiner

*Primary Examiner*—Leszek Kiliman
(74) *Attorney, Agent, or Firm*—Oppedahl & Larson LLP

(57) ABSTRACT

Dendrimer additives incorporated in thermoplastic resins (such as polycarbonate resins) are effective to alter the surface characteristics of the thermoplastic resin. Such compositions can be injection molded to produce articles in which the dendrimer additive is concentrated at the surface of the article to alter the properties of the resin. By selection of the type of dendrimer additive, the resulting characteristics of the molded article may be controlled.

10 Claims, 3 Drawing Sheets

Cross head Speed: 500mm/min.

Initial Distance: 105mm    Max Stroke: 95mm

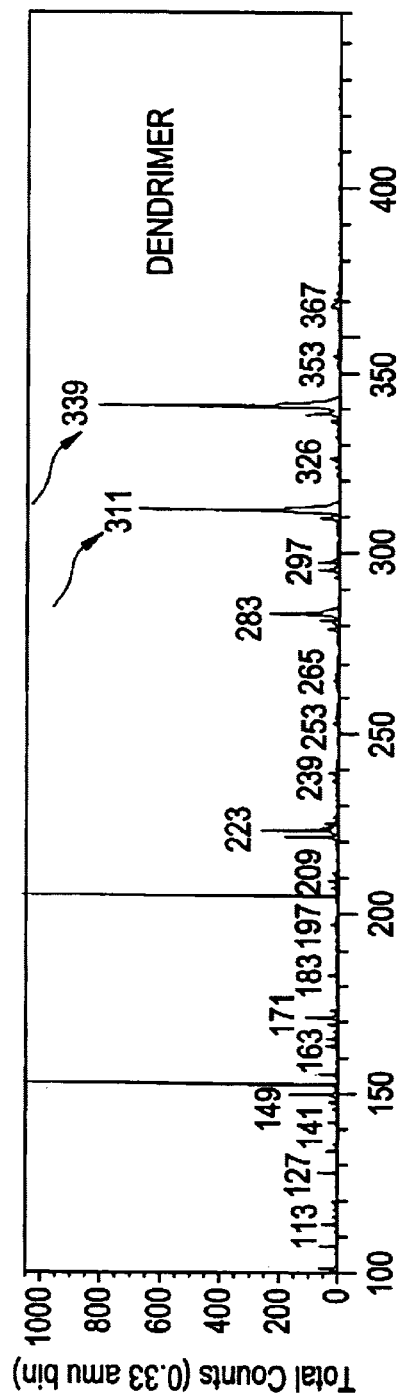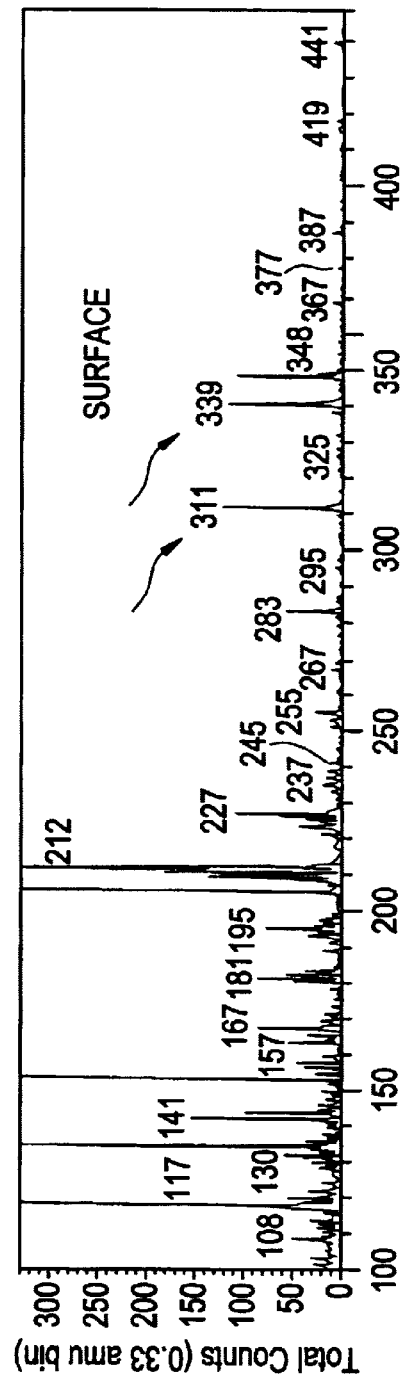

USE OF DENDRIMERS AS A PROCESSING AID AND SURFACE MODIFIERS FOR THERMOPLASTIC RESINS

CROSS-REFERENCE TO RELATED APPLICATIONS

This application is a continuation application of and claims from U.S. application Ser. No. 09/539,272 filed on Mar. 30, 2000, now U.S. Pat. No. 6,497,959 which is hereby incorporated by reference.

BACKGROUND OF THE INVENTION

This application relates to the use of dendrimers as a component of thermoplastic resin compositions, such as polycarbonates, to achieve desirable surface properties in molded articles.

Polycarbonate is widely used as an engineering thermoplastic owing to its unique combination of toughness, stiffness, high softening-temperature and processability. However, molded articles formed from polycarbonates have several limitations such as low scratch, abrasion and chemical resistance and susceptibility to UV degradation. To counter these limitations, coating have been applied to the surface of the molded article. For example, scratch resistant coatings applied to molded polycarbonate allows it to be used as optical and headlamp lenses. UV-protective coatings allow polycarbonate to be used in exterior applications. Coatings are also applied for decorative and aesthetic purposes. For example, molded polycarbonate articles can be coated to look like chrome, wood, painted metal and the like. Such coated articles can have a soft, luxurious feel, and provide reduced glare. One the other hand, coating are typically applied in a separate step, which reduces productivity and adds to the cost of the product. Morever, most coating are applied by a solvent evaporation technique which creates solvent emissions and requires a solvent recovery system. This further adds to the cost of manufacturing.

The alternative to applying a coating to a molded article is to incorporate an additive within the bulk of the polycarbonate resin that provides the desired functional characteristics. For example, siloxane copolymers may be added to improve chemical resistance, while antistatic agents are added to minimize static charge build-up. Conductive carbon black has been utilized as an additive to facilitate electrostatic painting of the molded article. Unfortunately, while these additives are beneficial in the specific property for which they are added, they usually alter other material properties in an undesirable fashion. In particular, such additives frequently make the polycarbonate more brittle, and more susceptible to molding defects. In addition, they may be associated with a reduction in low-temperature ductility, softening temperature, modulus and increased plate-out.

U.S. Pat. No. 5,820,808 describes a method for making surface-modified articles using small amounts of an additive which is incompatible with the bulk polymer. The additive is dispersed within the bulk polymer as discrete droplets, and because of its incompatibility is driven to the surface in the injection molding apparatus. It has been reported, however, that adding incompatible additives to a polymer resin tends to result in delamination in injection molded articles. (Bucknall, C. B., *Toughened Plastics*, Applied Science, London (1977). Moreover, the addition of incompatible additives tends to reduce physical properties of the final molded article.

Thus, there remains room for improvement in the production of molded articles with desirable surface properties.

SUMMARY OF THE INVENTION

The present invention provides compositions comprising:
(a) a thermoplastic resin; and
(b) a dendrimer additive in an amount effective to alter the surface characteristics of the thermoplastic resin. These compositions can be injection molded to produce articles in which the dendrimer additive is concentrated at the surface of the article to alter the properties of the resin. By selection of the type of dendrimer additive, the resulting characteristics of the molded article may be controlled.

BRIEF DESCRIPTION OF THE DRAWINGS

FIGS. 2A–C show ToF-SIMS spectra for dendrimer alone (FIG. 2A), the surface of a disk molded from polycarbonate plus dendrimer (FIG. 2B), and the spectra of the surface exposed by removing a 100 $\mu$m layer (FIG. 2C)

DETAILED DESCRIPTION OF THE INVENTION

The present invention provides thermoplastic resin compositions with improved characteristics. The compositions comprise a thermoplastic resin and a dendrimer additive component.

As used in the specification and claims of this application, the term thermoplastic resin refers to thermoplastic polymers and copolymers in general, and to blends thereof. A preferred thermoplastic resin is polycarbonate, which may be used in any of the various grades known in the art, including optical grades and high molecular weight resins used for making impact-resistant articles. Other non-limiting examples of thermoplastic resins which may be suitably employed in the compositions of the invention are polyethylene terephthalate, polybutylene terephthalate, polyphenylene ether, polyamide, polypropylene, blends of polyphenylene ether and polystyrene, blends of polyphenylene ether and polyamide, polyetherimide and blends of polyetherimide and polypropylene.

As used in the specification and claims of this application, the term "dendrimer additive" refers to dendritic and hyper-branched polymers. Such polymers have a densely branched structure. Dendrimers with identical repeat unit can be characterized with the formula

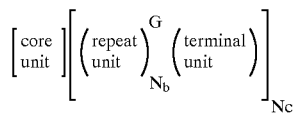

Figure 1:
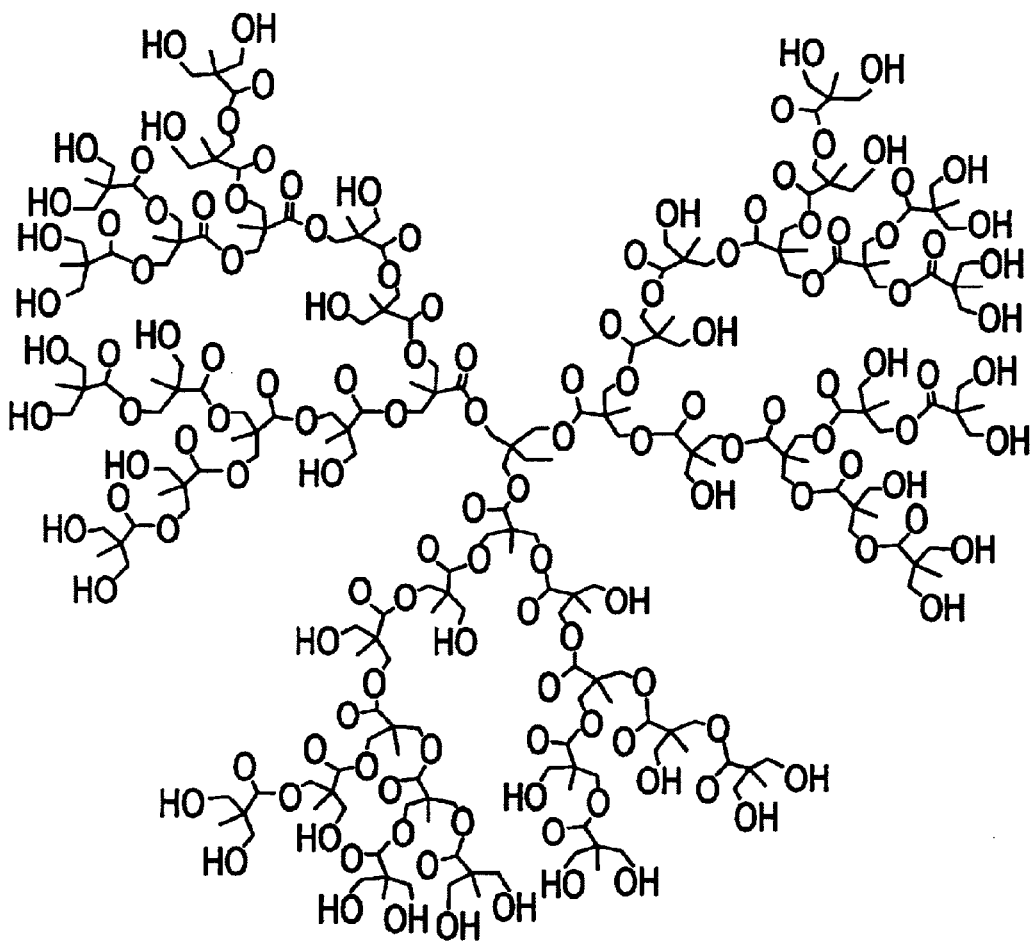
FIG. 1 shows the structure of a highly-branched hydroxy-terminated dendrite polymer of a polyester type.

Although the present application is not limited to the use of such dendrimers, this formula is useful for characterization of the meaning of the term "dendrimer" in the specification and claims of this application. Thus, a dendrimer following this general form has a central core unit and some number of branches ($N_c$) attached to the core. For purposes of this invention, the number $N_c \geq 3$. FIG. 1 shows the structure of a highly-branched hydroxy-terminated dendritic polymer of a polyester type suitable for use in the invention for which $N_c=3$. Within each of the $N_c$ branches attached to the core there are subbranches leading to terminal units. This is represented in the general formula by the terms G, which represents the number of generations of dendrimer synthesis and $N_b$ which is the branch multiplicyt of the repeat unit. For purposes of the present invention, both G and $N_b$ have a value of $\geq 2$.

Dendrimer additives used in the invention may be made using a variety of polymeric backbone materials, and with terminal groups consistent with the properties to be obtained. Examples of specific backbone groups which may be employed include polyesters, polysiloxanes, polyolefins, polystyrene and polyamides. Examples of specific terminal groups hydroxy groups, alkyl groups, epoxy groups, silanol, acrylate and methlacrylate esters, trialkoxysilane, unsaturated fatty esters, aliphatic and aromatic carboxylic acid aesters and tertiary amines. Materials for use as dendrimer additives in the compositions of the invention are available commercially, and their synthesis is known in the art, for example from U.S. Pat. Nos. 5,777,129 and 6,037,444 and the patents and publications cited therein.

The terminal groups of the dendrimer additives are selected to achieve the surface properties which are desired in the final molded article. For example, incorporation of hydroxy-terminated dendrimers increases the static surface charge on molded articles making them suitable for use in electrostatic painting. Conversely, methyl-terminated dendrimers reduce the static surface charge on molded articles. Thus, methyl-terminated dendrimers might be suitably employed in compositions for optical applications. Other end groups can be used in achieve other surface properties, including the following:

| End Group | Surface Property |
| --- | --- |
| Hydroxyl | Static |
| Alkyl | Reduced Static, moisture resistance |
| Acrylate | Chemical and Scratch Resistance |
| Epoxy | Chemical Resistance, Hydrolytic resistance |
| Halogenated hydrocarbon, siloxane, phosphate esters | Flame retardancy |
| Benozphenone, benzotriazole, amines, phenyl salicylate | UV Resistance |
| Low surface energy groups such as fluorinated hydrocarbons | Stain Resistance |

In addition to specific modifications of the surface characteristics of molded articles, it has also been found that incorporation of dendrimer additives results in an increase in the melt flow index (MFI) of the composition. This increase is indicative of an improvement in the processability of the polymer. Thus, the dendrimer additives of the invention provide improved properties beyond any enhanced surface characteristics, and these improvements in processability are independent of the nature of the terminal groups of the dendrimer.

The dendrimer additives are incorporated in the compositions of the invention in an amount effective to alter the surface characteristics of the thermoplastic resin after molding. Because the dendrimer additives tend to migrate to the surface of a molded article, the amount of dendrimer additive employed can be quite low. Thus, in general, the amount of dendrimer additive will be in the range of from 0.1 to 5% by weight of the composition.

In addition to the thermoplastic resin and the dendrimer additive, the compositions of the invention may include additional additives known in the art for modifying the properties of a thermoplastic resins. Thus, the compositions may include impact modifiers such as styrene-butadiene thermoplastic elastomers, fire-retardant additives, colorants, thermal stabilizers, antioxidants, antistatic agents and flow promoters.

While not intending to be bound by a particular mechanism, it is believed that the mechanism of action through which dendrimer additives migrate to the surface of molded articles is different from that described in U.S. Pat. No. 5,820,808, because it does not depend on incompatability between the dendrimer additive and thermoplastic resin. Rather, the differential migration arises as a result of rheological difference between the dendrimer additive and the thermoplastic resin. When a thermoplastic resin with a low concentration of dendrimer is subjected to a non-uniform deformation flow field, the resin chains (because of their substantially linear shape) migrate away from regions of higher deformation. Conversely, the dendrimers, which have a unique somewhat spherical shape, migrate towards regions of higher deformation. The driving force for this differential migration is entropic in nature. The thermoplastic resin chains are more ordered in the region of higher deformation and hence have lower entropy. These chains therefore migrate towards regions of lower deformation, where they can achieve more random conformations, with higher conformational entropies. On the other hand, the dendrimers, due to their extremely high mobility (diffusion coefficient), small size and low viscosity move into the region of higher deformation which has been vacated by the thermoplastic resin. The extent of such deformation-induced migration depends on the rate of deformation, and the molecular characteristics of the thermoplastic polymer and the dendrimer, such as relaxation time and translational diffusivity. (See Agarwal et al., "Migration of macromolecules under flow: the physical origin and engineering implications", Chem. Eng. Sci. 49 (11): 1693–1717 (1994); Bhave et al., "Kinetic theory and rheology of dilute non-homogeneous polymer solutions", J. Chem. Phys. 95(4): 2988–3000 (1991).

Figure 2C:
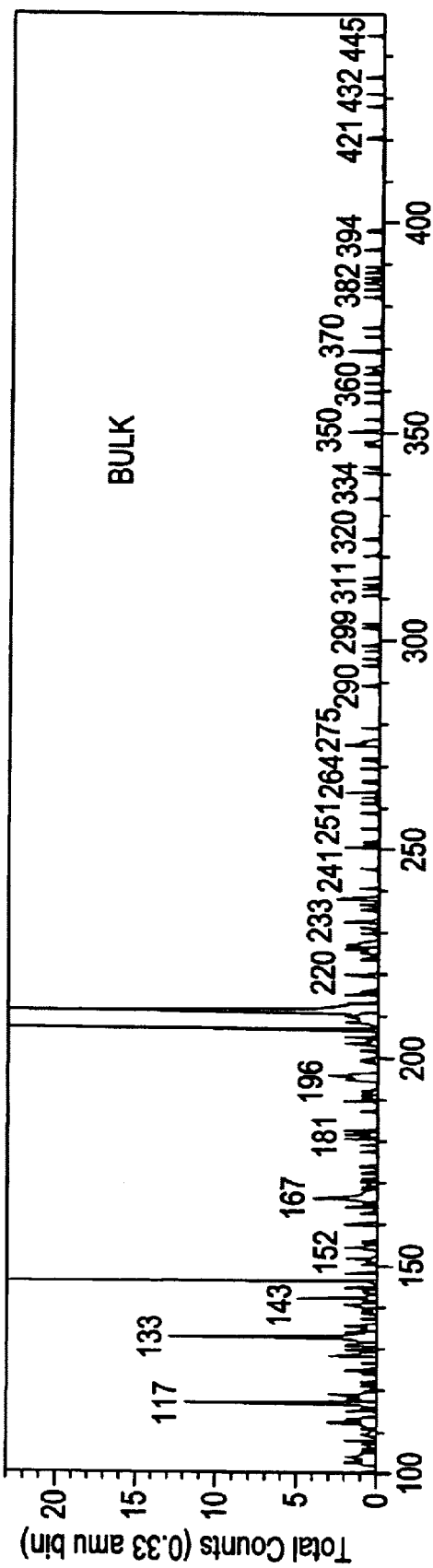

The practical effect of the migration of thermoplastic resins to regions of lower deformation and of the dendrimer additive to regions of higher deformation can be seen from an analysis of an injection molded product. An injection-moldable composition is formed by mixing a thermoplastic resin (such as polycarbonate) with a small concentration of dendrimer additive. When the injection molding mixture is forced into the cavity during the mold-filling process, the material undergoes large deformation rates (for example 1,000 to 100,000 $sec^{-1}$). Particularly, the material experience large elongational gradients near the advancing flow front and large shear rates and rate gradients near the mold wall. The combination of large shear/elongational rates and their gradients results in the migration of dendrimer towards the walls of the mold. As the material reaches the wall, it is cooled down rapidly, thereby producing a surface which has a higher concentration of dendrimer than the bulk. At the same time, the core of the molded article has a depleted concentration of dendrimer, such that desirable properties of the bull resin are minimally effected. This distribution of dendrimer additive was confirmed using Time-of-Flight Secondary Ion Mass Spectrometry (ToF-SIMS) to evaluate a molded optical grade polycarbonate disk fabricated with methyl-terminated dendrimer. As shown in FIGS. 2A–C, the peaks associated with the dendrimer alone are found to a significant extent in the surface portion of the disk, but not in the bulk polymer. Thus, when the compositions of the invention are used to prepare molded articles, the articles have a central bulk region and a peripheral surface region, with the majority (i.e, in excess of 50%) of the dendrimer additive being located in the surface region.

The compositions of the invention may be utilized to form a variety of molded articles consistent with the applications in which the included thermoplastic resins are normally used. Specific, non-limiting examples of types of molded articles include optical disks, optical lenses, building and construction components, water bottles, electronic equipment housings, office equipment, electrical appliances, health care components and cellular phone housings.

The invention will now be further described with reference to the following non-limiting examples.

EXAMPLE 1

Polycarbonate (PC) blends were prepared from 98 to 100 parts of a polycarbonate resin having $M_w$ of more than 18,000 with 0.1 to 2 parts of a dendritic polymer. The dendritic polymers used were obtained from Perstorp Specialty Chemicals, Sweden, and are sold with the product designations of H30, H3200 and E1. Characteristics of these products are summarized in Table 1.

The blends were prepared by mixing the constituents in pellet, powder or liquid form (as supplied by the manufacturer) and extruding them in a twin-screw extruder. The extruder was operated at 300 rpm with the temperature of the metering zone at 270° C. Optical disk substrates (diameter=120 mm, thickness=1.2 mm) were injection molded using the extruded composition. Values for melt flow index (MFI) were determined at 250° C. under 1.2 kg load to provide a quantitative measure of the processability of the compositions.

Figure 3:
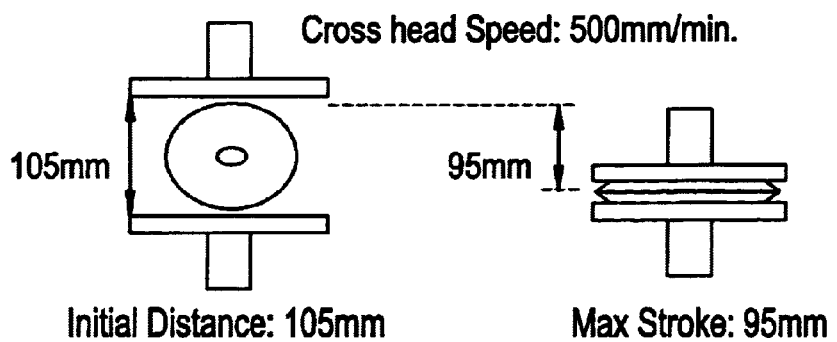
FIG. 3 shows the test set-up used to measure ductility of molded optical disk substrates.

The ductility of the molded substrates was measured in terms of energy absorbed during a compression-bending test in a specially designed jig fixture. A schematic representation of the test set-up is shown in FIG. 3. A disk was placed between the jigs at an initial separation of 105 mm. The lower jig is moved upwards at 500 mm/mm, and the energy expended to bend the disk is monitored. The maximum stroke was 95 mm.

Static charge on the molded disks, immediately after molding, was monitored using a static charge meter.

Table 2 summarizes the compositions tested and the results in the aforementioned tests. It can be seen that MFI of all of the PC-dendrimer blends is high than that of the PC resin. Increasing amounts of dendrimer increased the MFI. Furthermore, the ductility of the disks was found to be the same for the blends and the unblended PC. Thus, PC-dendrimer blends offer improved processability (as reflected in the increased MFI) without adverse effects on the mechanical properties of the molded disks. Furthermore, a dramatic reduction in static values was observed for blends containing an inert dendrimer (H-3200) with alkyl (methyl) terminal groups. Increased static values were observed for blends containing the hydroxylated dendrimer (H30).

EXAMPLE 2

A disk prepared using the H3200 dendrimer at a level of 0.1% was evaluated by ToF-SIMS to assess the distribution of the dendrimer within the disk. ToF-SIMS uses a pulsed ion beam to remove molecules from the very outermost surface of a sample (about 10 nm), and can be performed at a sufficiently low intensity to insure that molecules are not broken into constituent pieces. Spectra as shown in FIGS. 2A–C were obtained for neat dendrimer H3200 (FIG. 2A), the surface of the disk after molding (FIG. 2B) and the surface of the disk after removal of the layer approximately 100 μm thick from the surface of the molded disk. (FIG. 2C). The arrows in FIGS. 2A and 2B indicate characteristic peaks associated with the dendrimer H3200. These peaks clearly appear in the spectrum of the disk, as molded, but are essentially absent from the spectrum for the disk with the surface layer removed. Thus, the dendrimers are preferentially located within the top 100 μm of the surface of the disk. This allows dendrimers to be used to manipulate the surface characteristics of the molded article while minimizing the effect on the bulk properties of the base resin.

TABLE I

Molecular characteristics of dendritic polymers

| Dendrimer | End-group | Number of End-groups/molecule | Molecular weight |
|---|---|---|---|
| H30 | Hydroxy | 32 | 3500 |
| H3200 | Methyl | 32 | 3500 |
| E1 | Epoxy | 11 | 10500 |

TABLE II

Flow (MFI), Ductility (Energy), and Static data for a few representative PC-dendrimer blends

| | Composition | | | | | | |
|---|---|---|---|---|---|---|---|
| | A | B | C | D | E | F | G |
| PC (MW = 18,242) | 100 | 100 | 100 | 100 | 100 | 100 | 100 |
| H3200 | 0 | 0.1 | 0.5 | 0 | 0 | 0 | 0 |
| H30 | 0 | 0 | 0 | 0.1 | 0.5 | 0 | 0 |
| E1 | 0 | 0 | 0 | 0 | 0 | 0.1 | 0.5 |
| MFI (cc/10 min) | 12.7 | 13.1 | 14.2 | 13.0 | 13.9 | 12.9 | 13.9 |
| Energy (N · m) | 5.01 | 5.03 | 5.01 | 5.11 | 5.08 | 5.16 | 5.08 |
| Static (kV) | −3.10 | −0.81 | −0.07 | −6.4 | −8.6 | — | — |

What is claimed is:

1. An injection moldable composition comprising:
   (a) a thermoplastic resin; and
   (b) a dendrimer additive in an amount effective to alter the surface characteristics of the thermoplastic resin as compared to the bulk resin after injection molding, wherein the thermoplastic resin and the dendrimer are such that the dendrimer additive remains mobile in the thermoplastic resin during injection molding.

2. The composition of claim 1, wherein the dendrimer additive is present in an amount from 0.1 to 5% by weight of the total composition.

3. The composition or claim 2, wherein the thermoplastic resin is a polycarbonate resin.

4. The composition of claim 3, wherein the dendrimer additive is present in an amount from 0.1 to 5% by weight of the total composition.

5. The composition of claim 1, wherein the dendrimer has terminal groups selected from the group consisting of hydroxyl, alkyl, acrylate, epoxy, halogenated hydrocarbon, siloxane, phosphate esters, benozphenone, benzotriazole, amines, phenyl salicylate, and fluorinated hydrocarbons.

6. A method for modifying the surface properties of an article formed by injection molding a thermoplastic resin composition, comprising the step of adding to the thermoplastic resin composition prior to injection molding a dendrimer additive in an amount effective to alter the surface characteristics of the thermoplastic resin as compared to the bulk resin, wherein the thermoplastic resin and the dendrimer are such that the dendrimer additive remains mobile in the thermoplastic resin during injection molding.

7. The method of claim 6, wherein the dendrimer has terminal groups selected from the group consisting of hydroxyl, alkyl, acrylate, epoxy, halogenated hydrocarbon, siloxane, phosphate esters, benozphenone, benzotriazole, amines, phenyl salicylate, and fluorinated hydrocarbons.

8. The method of claim 6, wherein the dendrimer additive is added in an amount from 0.1 to 5% by weight of the thermoplastic resin composition.

9. The method of claim 8, wherein the dendrimer additive comprises hydroxyl terminal groups, whereby the static charge on the surface of the article are increased.

10. The method of claim 6, wherein the dendrimer additive comprises alkyl terminal groups, whereby the static charge on the surface of the article are decreased.

* * * * *